United States Patent [19]

Frommelt et al.

[11] Patent Number: 4,799,341
[45] Date of Patent: Jan. 24, 1989

[54] WEDGE SEAL FOR LOADING DOCK SHELTER

[75] Inventors: John A. Frommelt, Dubuque, Iowa; Kenneth Lenz, East Dubuque, Ill.

[73] Assignee: Frommelt Industries, Inc., Dubuque, Iowa

[21] Appl. No.: 100,127

[22] Filed: Sep. 23, 1987

[51] Int. Cl.⁴ ............................................. E04H 14/00
[52] U.S. Cl. ................................................. 52/173 DS
[58] Field of Search .................. 52/173 DS, 2 DS, 173

[56] References Cited

U.S. PATENT DOCUMENTS

| | | |
|---|---|---|
| 3,375,625 | 4/1968 | Edkins et al. |
| 3,385,001 | 5/1968 | Bordner . |
| 3,500,599 | 3/1970 | Sciolino . |
| 3,613,324 | 10/1971 | Conger .............................. 52/173 DS |
| 3,638,667 | 2/1972 | Frommelt et al. . |
| 3,896,517 | 7/1975 | Bigelow Jr. ....................... 52/173 DS |
| 3,994,103 | 11/1976 | Ouellet .............................. 52/173 DS |
| 4,045,925 | 9/1977 | O'Neal .............................. 52/173 DS |
| 4,120,067 | 10/1978 | Hone ................................. 52/173 DS |
| 4,574,542 | 3/1986 | Kleynjans ......................... 52/173 DS |
| 4,679,364 | 7/1987 | Fettig ................................ 52/173 DS |

Primary Examiner—Henry E. Raduazo
Attorney, Agent, or Firm—Emrich & Dithmar

[57] ABSTRACT

A loading dock shelter seal includes a head and a pair of opposed side pads disposed about a door opening in a wall. Each pad is comprised of an elongated, linear foam core and an outer flexible cover, with the head and side pads having complementary beveled end portions arranged in abutting end-to-end contact. Each of the pads is angled inwardly toward the center of the door opening in the wall which allows for outward deformation of the pads upon engagement with a truck using the loading dock, whereupon an outer angled portion of each of the pads is deformed outwardly in a bulging manner so as to enclose the periphery of the truck while an inner angled pad portion remains in sealed engagement with the top and side aft edges of the truck.

11 Claims, 2 Drawing Sheets

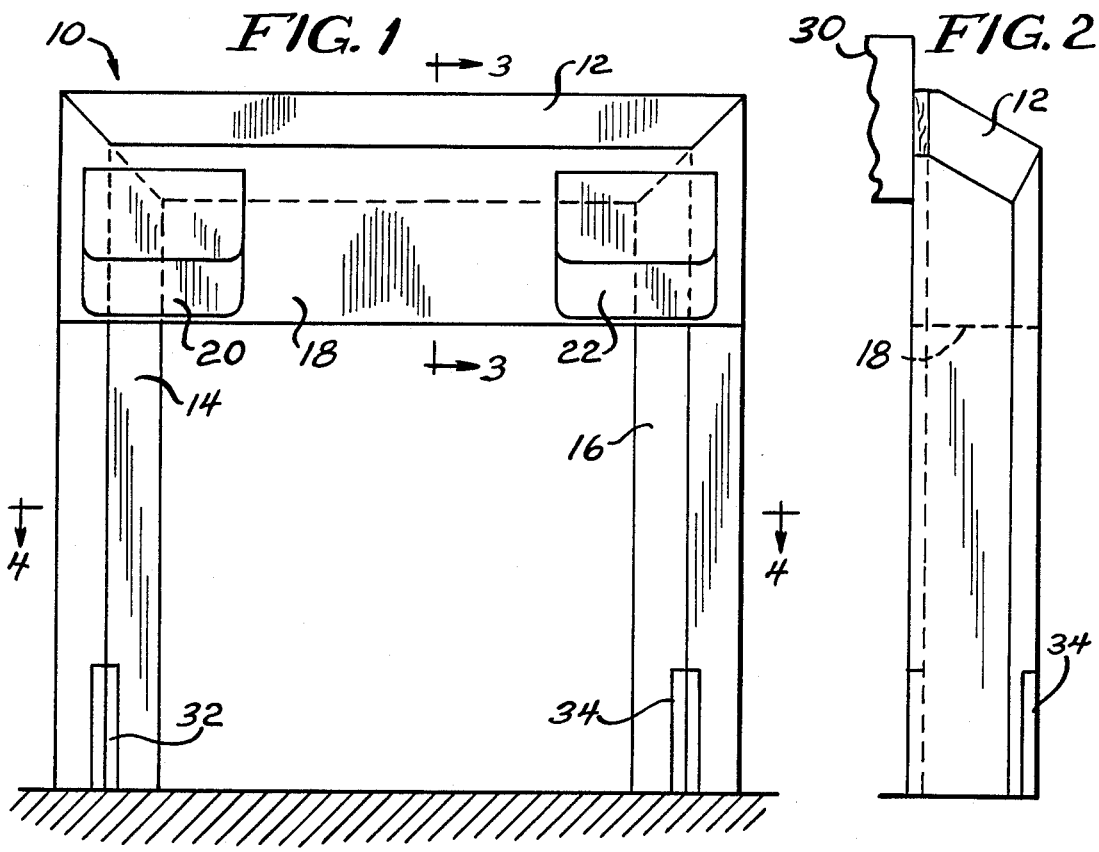
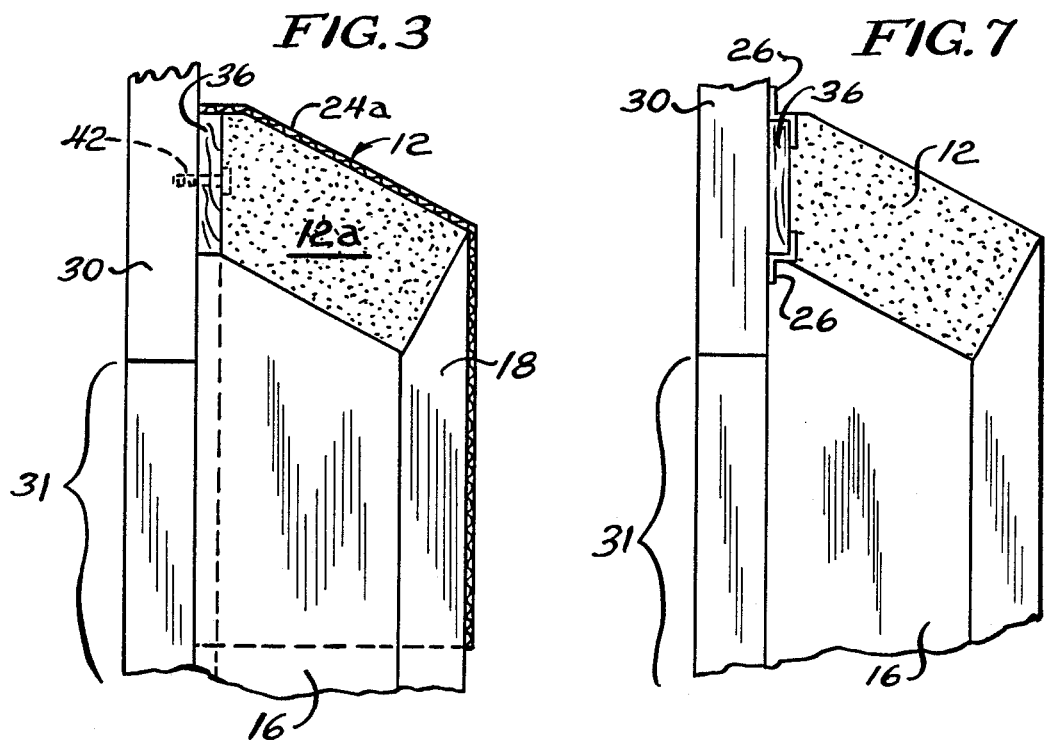

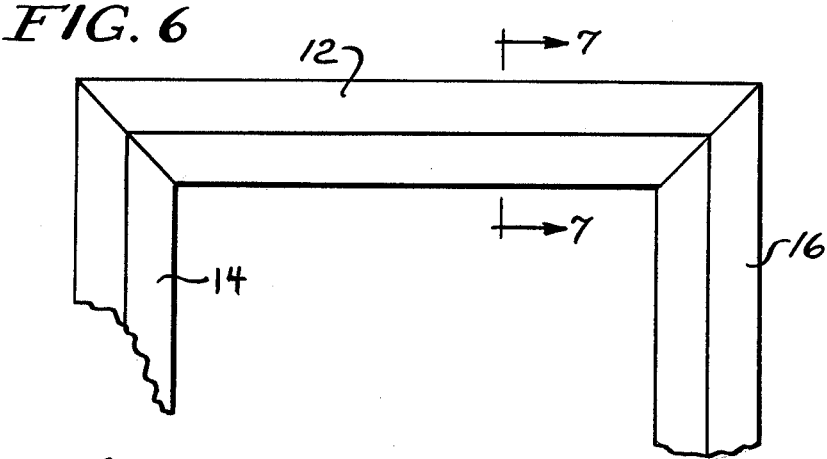
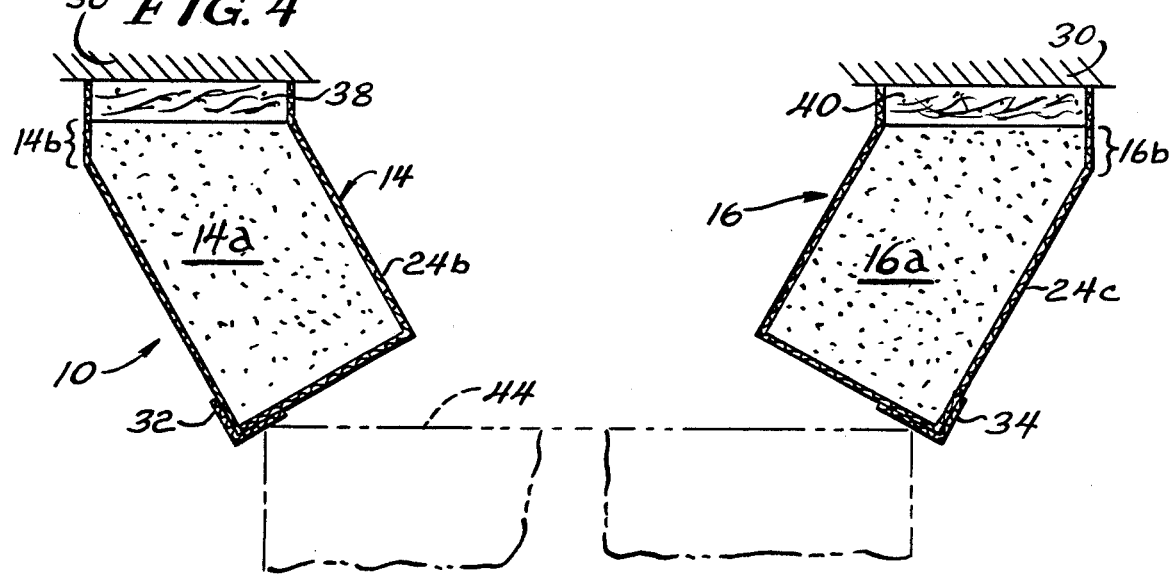
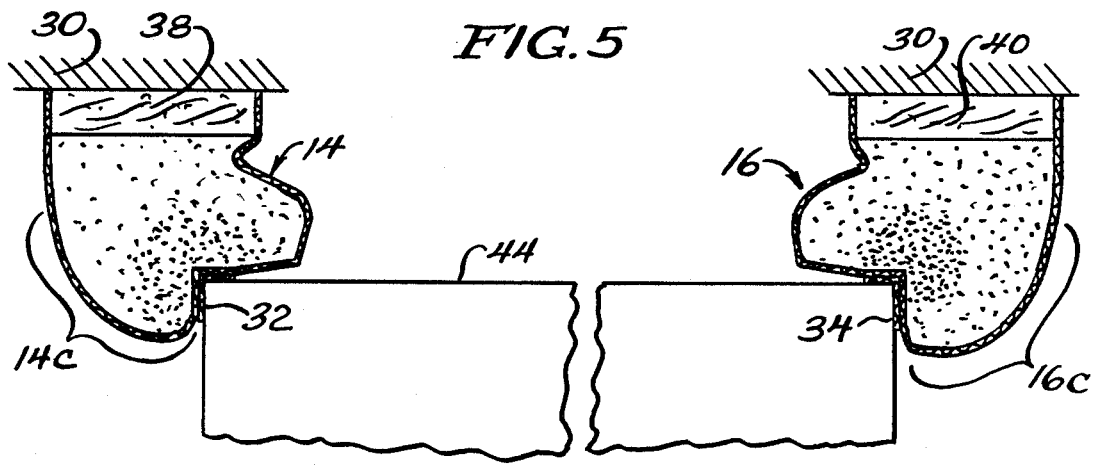

WEDGE SEAL FOR LOADING DOCK SHELTER

BACKGROUND OF THE INVENTION

This invention relates generally to loading dock shelters and is particularly directed to a deformable, resilient seal for a loading dock shelter.

Trucks or trailers with open rear doorways are typically backed into juxtaposition with a building doorway for loading and unloading. The width of the truck body is typically the same standard width as that of the building doorway. A loading dock shelter is typically disposed about the doorway to seal out the weather during loading and unloading and to provide an effective shelter for men and materials. These loading dock shelters typically include a seal arrangement for providing sealed engagement between the shelter structure and the truck cooperatively engaged therewith.

One type of loading dock shelter commonly in use employs a plurality of dock seals disposed about the sides and top of the building doorway, with each seal employing a compressible body of square or rectangular cross section. To ensure that the rear edges of the truck engage these compressible bodies, the dock seals must be so disposed that they overlap or extend into the truck's doorway. This arrangement has in the past resulted in a reduction in the size of the passageway in limiting access to the truck and has generally inhibited loading and unloading of the truck. An example of this type of loading dock shelter can be found in U.S. Pat. No. 3,375,625. Other examples of loading dock shelters which make use of resilient, yieldable members can be found in U.S. Pat. Nos. 3,638,667, 3,385,001 and 3,500,599.

Compressible pads or seals of the type discussed above also typically require considerable force to be exerted by the truck upon the seal in order to effect sealing engagement therebetween. Even greater compressive forces are typically required at low temperatures because of the more limited compressibility of the pad materials under extreme conditions. Also, when air and water become trapped within the outer cover of this type of seal, the compression and expansion characteristics of the dock seal are reduced, further inhibiting sealed engagement of the truck with the dock seal. The application of large compressive forces by a truck upon the loading dock shelter seal is precluded where the seal is affixed to a relatively lightweight wall such as of sheet metal. Therefore, prior art compression type loading dock shelter seals have been of limited use with relatively lightweight building structures unless such structures are reinforced which frequently is impractical and always increases the cost of the structure.

The present invention is intended to overcome the aforementioned limitations of the prior art by providing a wedge-shaped loading dock shelter seal comprised of a top and a pair of side pads which are oriented inwardly toward a doorway in a wall upon which the pads are mounted. Upon engagement by a truck of the top and side pads and the application of force thereto, the pads flex or bulge outwardly so as to minimize obstruction of an opening in the back of the truck while continuing to engage in a sealed manner the outer, aft periphery of the truck along the top and sides thereof.

OBJECTS AND SUMMARY OF THE INVENTION

Accordingly, it is an object of the present invention to provide an improved seal for a loading dock shelter.

It is another object of the present invention to provide a resilient, deformable seal for use in a loading dock shelter which is capable of closely conforming to the periphery of a truck or other loading/unloading vehicle with limited compressive force applied by the truck to the seal.

Yet another object of the present invention is to provide a seal for a loading dock shelter which can be used with lightweight buildings having minimal structural reinforcement.

A further object of the present invention is to provide a deformable loading dock shelter seal which conforms closely to the periphery of a truck using the loading dock by expanding outwardly upon engagement with the truck, resulting in minimal obstruction of the truck opening during loading/unloading.

The present invention contemplates a foam-filled loading dock shelter seal comprised of a head pad and a pair of side pads for use about a doorway or aperture in a wall. The two ends of the head pad and the upper ends of each of the two side pads are provided with complementary mitred portions and are arranged in abutting contact. With the head pad extending outward and downward from the wall and the two side pads extending outward from the wall and toward the center of the wall aperture, the pads are adapted to engage a truck using the loading dock and to be deflected inwardly and toward the wall upon impact with a truck. The angled orientation of each of the pads relative to the direction of movement of the truck as it backs into the loading dock shelter causes each of the pads to expand outwardly so as to maintain sealed engagement with the truck periphery with minimal obstruction of the opening in a back of the truck by the outwardly expanded seals.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is a front planar view of a loading dock shelter incorporating a wedge seal in accordance with the present invention;

FIG. 2 is a lateral view shown partially in phantom of the loading dock shelter of FIG. 1;

FIG. 3 is a sectional view of a portion of the loading dock shelter illustrated in FIG. 1 taken along sight line 3—3 therein;

FIG. 4 is a horizontal sectional view of the loading dock shelter illustrated in FIG. 1 taken along sight line 4—4 therein;

FIG. 5 illustrates the manner in which the wedge seal of the present invention engages in a sealed manner the aft lateral portions of a truck or van using the loading dock;

FIG. 6 is a front planar view of the upper portion of a wedge seal for use in a loading dock shelter in accordance with the present invention; and FIG. 7 is a sectional view of a portion of the loading dock shelter wedge seal illustrated in FIG. 6 taken along sight line 7—7 therein.

DETAILED DESCRIPTION OF THE PREFERRED EMBODIMENT

Referring to FIGS. 1 and 2, there are respectively shown front and side planar views of a loading dock shelter 10 incorporating a wedge seal in accordance with the present invention. FIG. 3 is a sectional view of an upper portion of the loading dock shelter 10 illustrated in FIG. 1 taken along sight line 3—3 therein.

The loading dock shelter 10 includes a head pad 12 and left and right side pads 14, 16. The directions "left" and "right" are taken with the loading dock shelter viewed from the front or toward the support wall 30 to which the loading dock shelter is mounted. Positioned over an upper, outer portion of the loading dock shelter 10 and extending the full width thereof is a head curtain 18. Attached to an outer portion of the head curtain 18 adjacent to respective ends thereof are left and right sets of protective pleats 20 and 22. The rows of left and right protective pleats 20, 22 are disposed generally vertically and are made of a suitable material, such as, for example, hypalon or a high strength, tear resistant, coated nylon fabric.

As shown in FIG. 3, the inner, proximal end of the head pad 12 is affixed to a head mounting beam or top rail 36 of a mounting frame. The top rail may be securely mounted to the support wall 30 by conventional means such as bolts 42 and is preferably comprised of a treated wood. As shown in FIG. 3, the head pad 12 is angled downwardly toward an aperture or doorway 31 in the support wall 30 and is comprised of a foam core 12a and a pad cover 24a. In addition, the two ends of the head pad 12 are mitred, or beveled, in a complementary configuration to the mitred upper ends of the left and right side pads 14, 16. This allows the side pads 14, 16 to be positioned in intimate, abutting contact with respective ends of the head pad 12 so as to form a continuous seal about the sides and top of the doorway 31 within the support wall 30.

Referring to FIG. 4, there is shown a horizontal sectional view of the loading dock shelter 10 illustrated in FIG. 1 taken along sight line 4—4 therein. As illustrated in FIG. 4, each of the left and right side pads 14, 16 is similarly provided with a respective mounting beam or side rail 38, 40. Each of the left, right and top mounting beams or rails is attached to the support wall 30 by conventional means such as mounting bolts or brackets (not shown for simplicity), with the proximal end of each of the pads affixed to its associated mounting beam by conventional means such as an epoxy glue.

As shown in FIG. 4, each of the left and right side pads 14, 16 includes a respective foam core 14a, 16a attached to a respective side rail 38, 40. Each of the left and right side rails 38, 40 is, in turn, securely mounted to the support wall 30 by conventional means such as mounting bolts which are not shown for simplicity. As in the case of the head pad 12, each of the left and right side pads 14, 16 further includes an outer pad cover 24b, 24c covering its associated foam core in a sealed manner. Additional details of the loading dock shelter seal can be seen in FIG. 6 which is a plan view of an upper portion of the present invention. FIG. 7 is a sectional view of the head and side pad seal arrangement illustrated in FIG. 6 taken along sight line 7—7 therein.

Pad covers 24a, 24b and 24c are disposed in tight fitting relation respectively about the outer portions of the head pad 12 and the left and right side pads 14, 16. Inner edges of these pad covers are securely attached to the top rail 36 as well as to the side rails 38, 40 by conventional means such as nailing strips. The pad covers thus isolate each of the head and side pads from the elements. In a preferred embodiment, the pad covers are comprised of hypalon or a high strength, tear resistant, coated nylon fabric. Breather holes may be provided in an end portion of each of the pad covers. The distal edges of each of the left and right side pads 14, 16 are each provided with a respective colored guide strip 32, 34 to facilitate viewing of the pads by an operator of a truck 44 shown in dotted line form in FIG. 4 as it is about to engage the side pads for loading or unloading of the truck. Each of the head and side pads 12, 14 and 16 includes a respective outer corner portion 12a, 14a and 16a. This angled extension of each of these pads permits these pads to be angled inwardly yet to expand outward in a bulging manner upon engagement and compression by a truck as shown in FIG. 5. The bulging portions of each of the aforementioned pads are identified as portions 14c and 16c for the side pads with a similar pad expansion section present in the head pad 12. The expandable portion of each of these pads allows them to expand outwardly while remaining in sealed contact with an aft edge of the truck. Outward expansion of the pads also results in a substantially reduced portion of the pad remaining within the doorway or opening of the truck facilitating its loading or unloading.

As shown in FIG. 5, the left and right side pads 14, 16 are shown engaged in a compressed manner by the truck 44 as it backs into the loading dock shelter. As described above and as shown in FIG. 5, each of the side pads thus expands outwardly beyond the side periphery of the vehicle 44 so as to ensure that each of these pads remains in sealed engagement with the truck 44. It can also be seen that with a substantial portion of each of the left and right side pads 14, 16 displaced outwardly away from the aperture about which the loading dock shelter is disposed, those portions of the side pads positioned inwardly of the lateral edges of the truck 44 are substantially reduced. By thus causing the side pads 14, 16 to be reconfigured in an outwardly bulging configuration, the side pads exhibit minimal overlapping and obstruction of the aft portion of the truck 44. The head pad 12 exhibits a similar reconfiguration characteristic upon engagement with and compression by a truck positioned in abutting contact therewith. The wedge seal of the present invention thus affords a high degree of sealing engagement with the periphery of a truck while minimizing obstruction of the truck's doorway.

There has thus been shown an improved wedge seal for a loading dock shelter which upon engagement by a truck backing into a loading dock reconfigures itself such that a larger portion of each of the head and side pads is positioned outward of the aft periphery of the van and in sealed engagement therewith, with only a small portion of each of the pads remaining within and obstructing the van's aft loading/unloading opening.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A loading dock shelter for use with a door opening in a wall and adapted to seal against the rear top and side edges of a truck backed against said loading dock shelter, said loading dock shelter comprising:

a resilient head pad mounted to the wall above the door opening therein and extending substantially the length of the door opening, said head pad having mitered end portions; and resilient left and right side pads mounted to the wall adjacent respective lateral portions of the door opening therein, each of said side pads having respective mitered upper end portions, wherein each of the mitered end portions of said head pad are positioned in abutting contact with a respective complementary mitered upper end of one of said side pads;

wherein each of said pads includes an inner side extending from the wall inwardly toward the door opening, a first outer side extending from and disposed substantially transversely to the wall, a second outer side displaced from the wall and continuous with said first outer side and extending inwardly toward the door opening, and a distal side continuous with and disposed generally transversely to said inner side and said second outer side and adapted to engage the rear edge of a truck at an acute angle, such that when a truck engages the loading dock shelter the second outer sides of each of said head and side pads expand outwardly in a bulging manner to allow the pads to be displaced outward from the edges of the truck while the distal sides of said pads engage an outer periphery of the rear top and side edges of the truck in a sealed manner.

2. The loading dock shelter of claim 1 wherein each of said pads includes an inner foam core.

3. The loading dock shelter of claim 2 wherein each of said pads further includes an outer cover disposed in tight fitting, sealed relation about its inner foam core.

4. The loading dock shelter of claim 3 wherein said outer cover is comprised of hypalon.

5. The loading dock shelter of claim 1 wherein the proximal and distal portions of each pad form an outside corner defined by an obtuse angle and wherein an outer surface of the distal portion of each pad bulges outward upon engagement of the loading dock shelter by a truck.

6. The loading dock shelter of claim 1 further comprising a support frame attached to each of said pads for mounting the loading dock shelter to the wall.

7. The loading dock shelter of claim 6 wherein said support frame includes a head mounting member as well as left and right mounting members respectively attached to said head and left and right side pads.

8. The loading dock shelter of claim 7 wherein each of said members comprises an elongated, linear beam affixed to the wall.

9. The loading dock shelter of claim 1 further comprising guide means coupled to each of said side pads to facilitate viewing of said side pads from the truck.

10. The loading dock shelter of claim 9 wherein said guide means comprises left and right reflective strips respectively affixed to the distal portions of said left and right side pads.

11. The loading dock shelter of claim 1 further comprising a head curtain disposed over said head pad and upper portions of said left and right side pads.

* * * * *